W. S. DAVIS.
HARROW.
No. 185,897.  Patented Jan. 2, 1877.
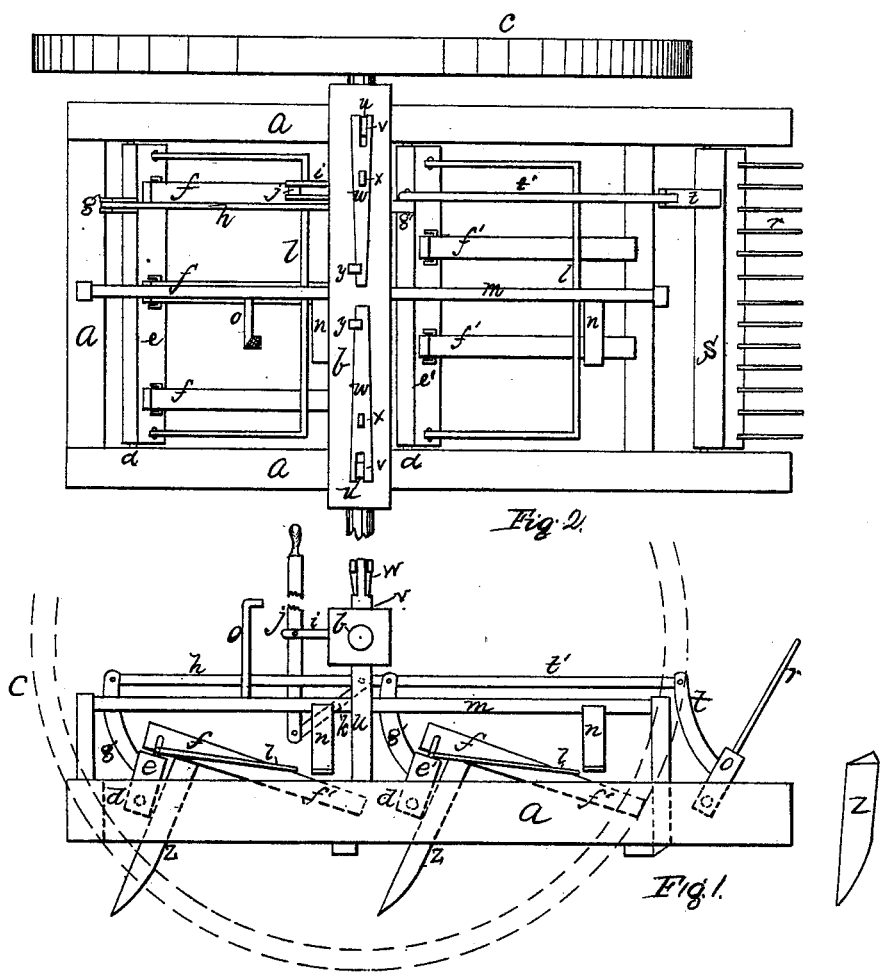

UNITED STATES PATENT OFFICE.

WILLIAM S. DAVIS, OF PITTSFIELD, MAINE, ASSIGNOR OF ONE-HALF HIS RIGHT TO WARREN L. PARKS, OF SAME PLACE.

IMPROVEMENT IN HARROWS.

Specification forming part of Letters Patent No. 185,897, dated January 2, 1877; application filed October 24, 1876.

*To all whom it may concern:*

Be it known that I, WILLIAM S. DAVIS, of Pittsfield, in the county of Somerset and State of Maine, have invented certain new and useful Improvements in Harrows; and I do hereby declare that the following is a full, clear, and exact description thereof, that will enable others skilled in the art to which it appertains to make and use the same, reference being had to the accompanying drawings, forming a part of this specification, in which—

Figure 1 shows a side view of my harrow; Fig. 2, a plan.

Same letters show like parts.

My invention relates to certain improvements in harrows, which will be readily understood by reference to the accompanying drawings.

These improvements consist, briefly, in devices for connecting the finger-bars carrying the teeth with the frame, enabling them to be easily raised or lowered; in an arrangement of levers for operating them; in a brake and operative mechanism for holding them down when necessary; in a peculiar arrangement of the teeth on the finger-bar; in the shape of the teeth; in the combination, with the harrow, of an evener and operative mechanism; and in devices whereby one side of the harrow-frame may be depressed when working on hilly ground or hill-side.

In the drawing, $a$ shows the frame of my harrow suspended from the axle $b$, of suitable wheels $c$. Across said frame, at $d\ d'$, are bars $e\ e'$, oblong in form, and eccentrically pivoted to the side pieces of the frame. To these bars $e\ e'$ are hinged the finger-bars $f$ in such a manner that when said bars $e\ e'$ are turned edgewise on their pivots said finger-bars are raised and supported in an elevated position. At $g\ g'$, on said bars $e\ e'$, are vertical levers rigidly attached to said bars, and connected together by a rod, $h$, pivoted to their tops, causing them to move simultaneously. Pivoted upon a suitable support, $i$, near the driver's seat, is a lever, $j$, attached to said rod $h$ by an intermediate link, $k$, so that by throwing said lever $j$ forward the bars $e\ e'$ are turned downward upon their pivots, allowing the teeth to enter the ground, and by reversing the lever said bars are raised, elevating the teeth, as stated.

When the ground to be harrowed is heavy, it is frequently desirable to apply a brake to the teeth to keep them in the earth. I effect this by means of brake-rods $l$ loosely pivoted to the bars $e\ e'$, and resting on the rear ends of the finger-bars $f$. A rod, $m$, is placed lengthwise of the machine, above the teeth, pivoted to standards at the front and rear. This rod is provided with fingers $n\ n$ and a lever, $o$, by means of which said fingers may be turned downward upon the rods $l$, and so held, forcing the teeth firmly down.

My teeth, shown at $z$, are made in the shape of a wedge, being thin upon their front edges and increasing in thickness toward the back, facilitating the clearing of the tooth and lessening the draft of the machine. They are attached to the finger-bars $f$, near the pivot which connects said finger-bars to the bars $l$, the greater portion of said finger-bars projecting beyond the tooth, as at $f'$, and serving by its weight to keep said tooth down.

As it is frequently convenient to smooth the ground after a crop has been sowed and harrowed, I attach to the rear of my harrow an evener, formed with spring-teeth $r$ secured to a bar, $o$, oblong in cross-section, and eccentrically pivoted to the frame $a$, or to an extension thereof. This is also provided with a vertical lever, $t$, connected by a rod, $t'$, to the vertical lever $g'$ of the bar $e'$, enabling it to be operated in like manner and at the same time with the bar $e'$ by the same lever $j$.

In order to allow one side or the other of my harrow-frame to be lowered to accommodate it to uneven or hilly ground, I attach said frame to the axle by means of rods $u\ u$ passing up through slots $v$ in said axle, and attached at their upper ends to levers $w\ w$ having a fulcrum at $x\ x$ upon the axle, and catches $y\ y$, holding them when not in use. When it becomes necessary to lower one side of the frame, the lever $w$ on that side is released from its catch $y$, the weight of the frame drawing down the rod $u$ attached to it, while the other side of the frame remains as before.

What I claim as my invention, and desire to secure by Letters Patent, is—

1. In a harrow, the combination of a frame, $a$, one or more eccentrically-pivoted bars, $e\ e'$, having finger-bars $f$ hinged thereto, and operative mechanism, to wit: arms $g\ g'$, rods $h\ t$, and lever $j$, by which said bars $e$ may be turned on their pivots, raising or lowering the finger-bars, as and for the purposes specified.

2. In combination with said frame $a$, bars $e\ e'$, and finger-bars $f$, the vertical levers $g\ g'$, rod $h$, lever $j$, and link $k$, arranged and operating as herein set forth, for the purposes specified.

3. In combination with frame $a$, and hinged tooth-carrying finger-bars $f$, the brake-rods $l$, and rod $m$, having fingers $n\ n$, and lever $o$, arranged and operating as set forth.

4. The combination of the pivoted finger-bar $f$ with the tooth $z$ attached near the pivoted end thereof, said finger-bar projecting beyond said tooth, as at $f'$, for the purposes set forth.

In testimony that I claim the foregoing I have hereunto set my hand this 13th day of October, 1876.

WILLIAM S. DAVIS.

Witnesses:
 JOHN R. MASON,
 WM. FRANKLIN SEAVEY.